(12) United States Patent
Kochan, Jr. et al.

(10) Patent No.: US 6,789,024 B1
(45) Date of Patent: Sep. 7, 2004

(54) FLOW CALCULATION SYSTEM

(75) Inventors: John R. Kochan, Jr., Naperville, IL (US); Anton Belehradek, Jr., Downers Grove, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 295 days.

(21) Appl. No.: 09/714,385

(22) Filed: Nov. 16, 2000

Related U.S. Application Data

(60) Provisional application No. 60/166,074, filed on Nov. 17, 1999.

(51) Int. Cl.[7] .................................................. G01F 1/00
(52) U.S. Cl. ......................... 702/45; 73/861; 73/861.43
(58) Field of Search ................. 702/45, 142; 73/861.23, 73/816.25, 861.03, 861, 195, 861.43, 861.27; 340/10.42, 5.62, 5.9

(56) References Cited

U.S. PATENT DOCUMENTS

| | | | | |
|---|---|---|---|---|
| 5,051,920 A | * | 9/1991 | Reams et al. | 702/45 |
| 5,139,044 A | * | 8/1992 | Otten et al. | 137/62 |
| 5,299,141 A | * | 3/1994 | Hungerford et al. | 141/1 |
| 5,633,809 A | * | 5/1997 | Wissenbach et al. | 702/142 |

* cited by examiner

Primary Examiner—John Barlow
Assistant Examiner—Hien Vo
(74) Attorney, Agent, or Firm—Welsh & Katz, Ltd.

(57) ABSTRACT

A microprocessor based flow meter establishes a series of pump on and off time intervals. Using previously entered flow rate information, the meter establishes quantities of flow during each pumping cycle or totals for predetermined time intervals such as days or weeks. Quantities of flow can be displayed on a per cycle basis or can be accumulated based on predetermined elapsed time intervals such as days or weeks.

39 Claims, 1 Drawing Sheet

FLOW CALCULATION SYSTEM

The benefit of the filing date of Nov. 17, 1999 of Provisional Application Serial No. 60/166,074 is hereby claimed.

FIELD OF THE INVENTION

The invention pertains to systems and methods for calculating the amount of fluid transferred over one or more time intervals. More particularly, the invention pertains to such systems which make calculations based on predetermined flow rates.

BACKGROUND OF THE INVENTION

Various types of pump control or fluid transfer control systems are known. Pumping is often initiated in response to rising fluid levels and ceases when the respective fluid level has been restored to an expected nominal value.

There are circumstances where it is desirable to be able to determine the amount of fluid that has been transferred. Alternately, there are circumstances where it is desirable to be able to establish a program for cycling one or more pumps on and off and also for keeping running totals of quantities of fluid which have been transferred or pumped.

There is a continuing need to be able to implement the above identified functions in a cost effective way in smaller systems. It would be desirable to simply and inexpensively be able to keep track of quantities of transferred fluid.

SUMMARY OF THE INVENTION

A flow meter in accordance with the present invention provides a measure of quantity of flow transferred during one or more time intervals by one or more pumps. One or more of flow rate parameters is manually entered into the system. Entry can be by keypad or by any other convenient user manipulatable interface. Flow rate can be entered for example in gallons per minute, liters per second, and so on.

A real time clock is provided to keep track of elapsed time which is indicative of time when the fluid in question is being transferred. Where the flow meter is used with an external pump control system, a start command is received from the external system. This command causes the real time clock to begin to measure the pumping time interval, for example by accumulating pulses in a buffer. When the pump motor is shut off and the start command has returned to a non-pumping state, the count in the buffer is indicative of the time interval during which the fluid was being transferred The time interval can be multiplied by the previously entered and stored flow rate parameter to establish the quantity of fluid which has been transferred during the measured time interval. The units of volume or quantity of fluid which has been transferred can be displayed on a local display for the user.

The amount of fluid which has been transferred or pumped in addition to being displayed can be stored in internal non-volatile memory for future use. As the pump continues to cycle and the start command initiates additional counting intervals in the flow meter, the various quantities of fluid associated with each of the pumping cycles can be accumulated in non-volatile memory. Each of the quantities of fluid during the respective pumping cycles can be displayed. The total amount of fluid pumped since the last system re-set can also be displayed.

In one embodiment, a user can enter a control program establishing time on/time off intervals for a plurality of pumps such as in an irrigation system or in a residential watering system. A processor in the system can execute the program and, based on an entered flow rate parameter, can accumulate in memory quantities of fluid pumped during each pumping cycle by each of the motors. Thus, the proprietor of a residence, commercial establishment or farm, for example, can easily control the on/off sequencing of a plurality of pumps during a time interval, for example, 24 hours. In addition, a running, accurate total of fluid that has been pumped can be maintained and can be used in establishing expected charges for the fluid.

The present flow meter can be used in a stand-alone mode for the purpose of calculating short term or long term quantities of transferred fluid in a system. In this mode, the user would initially program the system with flow rate data based upon either empirical or measured data. The system, in response to a start command or other signal could keep track and store the time durations during which the pump or pumps is or are active. The quantity of fluid pumped during each interval can be stored in system memory. The quantities pumped during each cycle can be viewed along with total quantities of pumped fluid.

In yet another aspect, the flow meter could function as a user programmable pump-timer/controller. In this embodiment, the user can program the meter with pump on/off interval information on a daily, weekly, or monthly basis. The meter can in turn activate the pump or pumps for the programmed time intervals at the programmed times.

In yet another embodiment, the meter can be programmed to perform auxiliary control functions. For example, during a chlorine dosing process, chlorine is added to a septic mixture to maintain specific bacterial concentrations. The amount of chlorine added is a function of the volume of septic material which has been pumped or transferred during a respective time interval.

Based on pre-established quantities of fluid or pump running time intervals or other predetermined intervals, chlorine or other processing chemicals or materials can be added to the transferred fluid. In this regard, a user can select one member of a plurality of dosing processes. Processes can include adding quantities of a chemical, such as chlorine, to a septic mix after some predetermined quantity, such as 40 gallons, of mix have been transferred. Alternately, a quantity of chemical or other material can be added after a predetermined interval of pump run time, such as for example 3 hours, 4 hours, or 72 hours.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
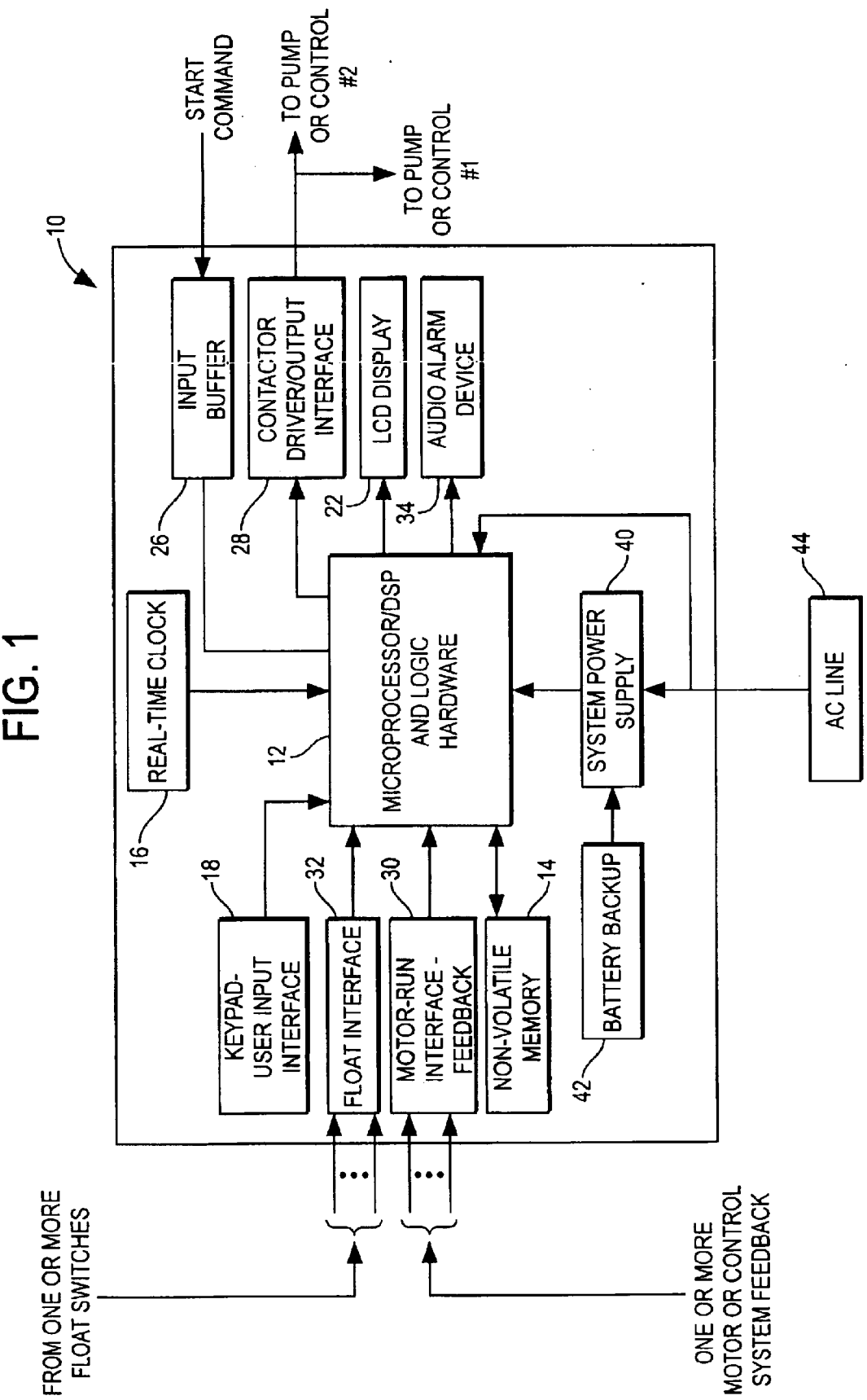
FIG. 1 is a block diagram of a system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a flow meter 10 in accordance with the present invention. The system 10 includes a control element 12 which could be implemented as a programmable processor such as a known type of microprocessor or digital signal processor. Programs and parameters or data can be stored in read/write non-volatile memory 14. Control element 12 is coupled to a real-time clock 16 which can be used to establish pumping cycle durations. Control element 12 is also coupled to a user input interface, such as a keypad 18, and an associated user output device such as liquid crystal display 22. The display 22 could also incorporate a touch responsive screen and function as an input device.

Environmental inputs and outputs include an input buffer 26 which can receive commands or other on/off signals from pump control units or the like. An output interface 28 can be coupled to one or more pumps or pump control devices for the purpose of cycling same on and off in accordance with pre-stored programs.

Feedback indicative of the operational status of pumps or pump control systems to which the system 10 is coupled can be provided via motor-run interface 30 which can receive status signals from motors or pump control systems which are being operated under the supervision of system 10. A float interface 32 can be provided to monitor fluid levels in one or more storage areas as needed. The control element 12 is also coupled to an audible alarm indicating output device 34 which can provide audible alarm in the event, for example, of a high fluid level being detected by interface 32.

In one aspect of operation, a user can enter a flow rate parameter in gallons per minute, gallons per second, liters per minute or the like via keypad, input interface, 18. This parameter is stored via processor 12 for subsequent use, for example in non-volatile memory 14.

Where system 10 is being used with a pump which has a separate control system, a start command can be coupled by that pump or that control system to input buffer 26. Receipt of the start command by control element 12 will result in a pumping or active time interval being measured by control element 12 using real-time clock 16.

When the start command drops back to an inactive value, the stored count, indicative of pumping interval, can be multiplied by the previously entered flow rate to establish a quantity of fluid transferred during that interval. The established flow rate as well as pumping intervals can be stored in memory 14. These can be reviewed by a user in response to commands entered by keypad 18 and the transferred fluid quantities can be displayed and viewed on display 22.

The most recent fluid quantities pumped during the last pumping cycle or cycles, depending on the number of pumps to which the unit 10 is connected can be displayed. The total amount of fluid pumped since last system reset can be displayed. Additionally, the quantity of fluid pumped from specific pumping cycles can also be displayed.

A user can enter a program, via interface 18, to control the operation of one or more motors coupled to one or more pumps to carry out a watering or irrigation function. For example, and without limitation, user input data to define such a fluid transfer sequence can include the following:

a Expected flow rate
b. Motor #1 Time On (Interval 1)
c. Motor #1 Time Off (Interval 1)
d. Motor #2 Time On (Interval 1)
e. Motor #2 Time Off (Interval 1)
f. Motor #1 Time On (Interval 2)
g. Motor #1 Time Off (Interval 2)
h. Motor #2 Time On (Interval 2)
i. Motor #2 Time Off (Interval 2)
j. Additional Motor #1 and Motor #2 timing intervals
k. Time of Day
l. Date The above specified pumping sequences can be executed on a daily basis, weekly basis, monthly basis, as desired to carry out the necessary irrigation or watering function. As a result of the user having programmed the device 10 with pump-run/stop data, it can then manage the pumping cycles. The necessary control signals required to stop and start the respective pumping processes would be generated by control element 12 in response to the previously stored pump cycle program.

Float signals coupled to interface 32 can perform various control functions either in conjunction with or separate from the control circuitry and pre-stored flow transfer sequences as described above Below are several examples and strategies for use float signals as control inputs.

EXAMPLE #1

A float input could be used in conjunction with the control circuitry to control pump turn on/turn off based on float status during preset hours only. When the period of float operation has expired the control circuitry 12 can resume operation of pumping system, ignoring the float conditional as a triggering means.

EXAMPLE #2

The float input can be used independently of the control circuitry and can control the operation of equipment based on float status. Here the float condition either initiates a control response (IE. pump turning on) or deactivates a control sequence. The float input signal can be used to trigger a high level alarm if fluid levels rise above a predetermined level. Similarly, the float can be used to trigger a response to low water levels.

The float hardware is separate from the float interface 32. It is intended as a supplement to the flow rate calculation system. The flow rate system is intended to operate with or without float switches and float switches are not required for timed control functions. The float interface 32 is a part of the flow rate calculation system and provides the control element 12 with a means of recognizing and responding to external events or functions.

Using the expected flow rate, the volume of pumped fluid can be determined. The volumes can be separately maintained for each pump. Total volume can also be determined. Where appropriate, a billing program can be stored in memory 14 to provide cost information.

A program can be loaded into memory 14 to control the delivery of additives to fluids. For example, chlorine could be added under control of element 12 based on elapsed pumping time. Alternately, additives could be added after predetermined quantities of fluid have been transferred. Output interface 28 can be coupled to additive supplying devices. Control element 12 can via interface 28 activate such devices.

The system 10 also includes an AC/DC power supply 40 and a battery back-up 42. In normal operation, the supply 40 energizes the system 10 with power from the utility lines 44. In the event of an AC power failure, the battery 42 provides power until the AC has been restored. Audible output device 34 can be activated to indicate a power failure.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A flow meter comprising:

control circuitry;

circuitry for storing a manually settable fluid flow rate parameter, coupled to the control circuitry;

time interval determination circuitry coupled to the control circuitry wherein in response to a received time interval defining signal, the determination circuitry establishes an indicium corresponding to the respective time interval and wherein the control circuitry combines the stored flow rate parameter with the indicium to establish a quantity of fluid delivered during the interval.

2. A flow meter as in claim 1 wherein the control circuitry includes a processor for executing a pre-stored flow determining program.

3. A flow meter as in claim 2 wherein the flow determining program is retained in the circuitry for storing.

4. A flow meter as in claim 2 wherein the program includes instructions for storing the established quantity of fluid.

5. A flow meter as in claim 4 which includes a visual display and instructions for presenting a visual representation of the established quantity of fluid on the display.

6. A flow meter as in claim 1 which includes an input device for entry of at least one parameter.

7. A flow meter as in claim 1 which includes an input device selected from a class which includes a keypad, and an input receiving display.

8. A flow meter as in claim 1 which includes instructions for carrying out a pre-stored fluid delivery schedule.

9. A flow meter as in claim 8 which includes an input device coupled to the control circuitry and instructions for entry and storage of a fluid delivery schedule.

10. A flow meter as in claim 9 wherein the schedule comprises sequences for producing a plurality of timed fluid delivery output signals.

11. A flow meter as in claim 2 which includes instructions for delivery of a selective additive, in accordance with a predefined schedule, to the fluid.

12. A flow meter as in claim 11 which includes instructions for entry and storage of an additive delivery schedule.

13. A flow meter as in claim 12 which includes an input device coupled to the control circuitry and instructions for entry and storage of a fluid delivery schedule.

14. A flow meter as in claim 1 which includes a source of electrical energy.

15. A flow meter as in claim 14 wherein the source comprises an AC/DC power supply.

16. A flow meter as in claim 14 wherein the source comprises a replaceable battery.

17. A flow meter as in claim 1 which includes an input port for receipt of a signal indicative of a depth of fluid in storage.

18. A flow meter as in claim 1 which includes an audible output device.

19. A flow meter as in claim 18 which includes an input port for receipt of a signal indicative of a depth of fluid in storage and instructions for actuating the audible output device in response thereto.

20. A self-contained flow meter comprising:
a housing;
energy receiving prongs carried by the housing;
a power supply with an input coupled to the prongs;
circuitry, coupled to the power supply, wherein the circuitry stores an expected flow rate parameter and at least one flow delivery interval;
circuitry for multiplying the parameter and the interval to establish a quantity of fluid delivered during the interval; and
a display device for visually presenting the quantity of fluid delivered.

21. A meter as in claim 20 which includes an input port for receipt of a flow delivery interval defining signal.

22. A meter as in claim 20 which includes at least one pre-stored additive supplying sequence.

23. A meter as in claim 22 which generates at least one additive supplying output signal in response to the additive supplying sequence.

24. A meter as in claim 20 which includes circuitry for entering at least one flow delivery command sequence.

25. A meter as in claim 24 with circuitry for executing the flow delivery command sequence.

26. A meter as in claim 20 wherein the circuitry includes a processor programmed with pre-stored instructions and a non-volatile memory unit for storing the flow rate parameter.

27. A meter as in claim 20 which includes a user operable input device.

28. A meter as in claim 27 which includes executable instructions for receiving the flow rate parameter from the input device and for storing the parameter.

29. A meter as in claim 28 which includes an input port for receipt of a flow delivery interval defining signal.

30. A meter as in claim 29 which includes executable instructions responsive to an interval start signal form the port to initiate the flow delivery interval and responsive to an interval end signal to terminate the interval and store it.

31. A meter as in claim 30 which includes executable instructions for storing a plurality of fluid delivery intervals.

32. A meter as in claim 30 which includes executable instructions for displaying a plurality of fluid quantities delivered during respective delivery intervals.

33. A flow meter comprising:
a manually operable input device for enabling a user to enter an expected flow rate parameter; and
control circuitry, coupled to the input device, for receipt of pump on/off signals indicative of one or more time intervals during which fluid is being pumped, and instructions, executable by the control circuitry for estimating a quantity of pumped fluid based on only the expected flow rate parameter and the one or more time intervals.

34. A meter as in claim 33 which includes instructions, executable by the control circuitry, for producing additive supply output signals in response to one of a time interval during which fluid has been pumped, or, an estimated quantity of fluid having been pumped.

35. A meter as in claim 33 wherein the control circuitry includes executable instructions enabling a user to program a fluid delivery schedule during a predetermined time interval, and in response to a previously entered flow rate parameter an estimated delivered quantity of fluid can be established for an executed delivery schedule.

36. A meter as in claim 35 which includes instructions for manually establishing a plurality of different fluid delivery schedules and for estimating fluid delivery for each based on one or more previously manually entered flow rates.

37. A meter as in claim 33 which includes instructions for arithmetically combining the expected flow rate parameter and the one or more time intervals.

38. An estimating device comprising a programmed processor executable instructions for receiving and storing one or more estimated fluid flow rates, circuitry, coupled to the processor for receiving pump operating time interval signals and additional executable instructions for combining the estimated flow rates with the sensed pump operating time intervals to produce an estimated quantity of delivered fluid.

39. A device as in claim 38 which includes circuitry to deliver a quantity of an additive to an estimated volume of delivered fluid based upon the received estimated flow rates.

* * * * *